United States Patent

[11] 3,532,094

| [72] | Inventor | Norman O. Stahl |
|---|---|---|
| | | 201 Eastern Parkway, Brooklyn, New York 11238 |
| [21] | Appl. No. | 654,929 |
| [22] | Filed | July 20, 1967 |
| [45] | Patented | Oct. 6, 1970 |

[54] CRYOGENIC INSTRUMENT WITH DETACHABLE PROBE
1 Claim, 6 Drawing Figs.

| [52] | U.S. Cl. | 128/303.1 |
| [51] | Int. Cl. | A61b 17/36 |
| [50] | Field of Search | 128/303, 303.1, 400, 401 |

[56] References Cited
UNITED STATES PATENTS

| 2,746,264 | 5/1956 | Keyes | 128/303.1(UX) |
| 3,259,131 | 7/1966 | Kanbar et al. | 128/303.1 |
| 3,270,744 | 9/1966 | Katz et al. | 128/303.1 |
| 3,343,544 | 9/1967 | Dunn et al. | 128/303.1 |
| 3,434,477 | 3/1969 | Thomas | 128/303.1 |

Primary Examiner—Richard C. Pinkham
Assistant Examiner—Richard J. Apley
Attorney—Joerren and Durstewitz ABSTRACT: A cryogenic instrument is provided for surgical use wherein the instrument tip is brought to a extremely low temperature by the expansion of Freon gas so that tissue will adhere thereto upon contact and may be lifted from its position by the surgeon. The instrument is moreover capable of sterilization and small enough to be used in constricted areas.

Patented Oct. 6, 1970
3,532,094
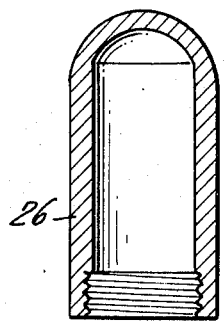
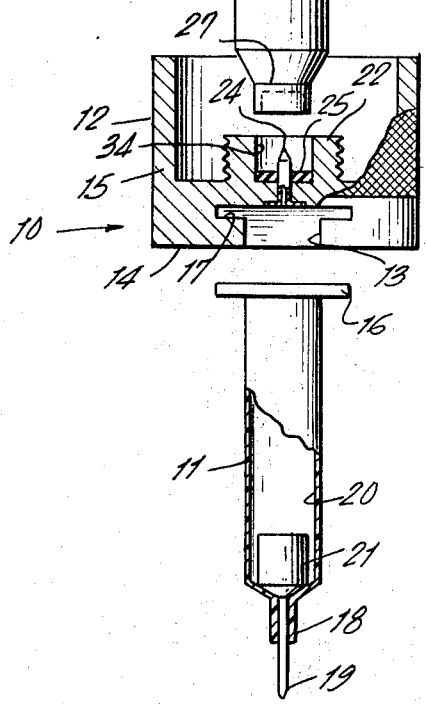
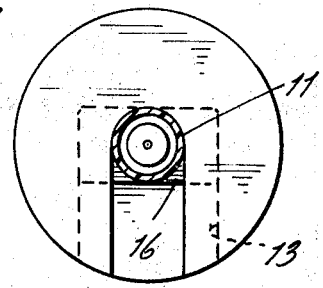
FIG.1
FIG.3
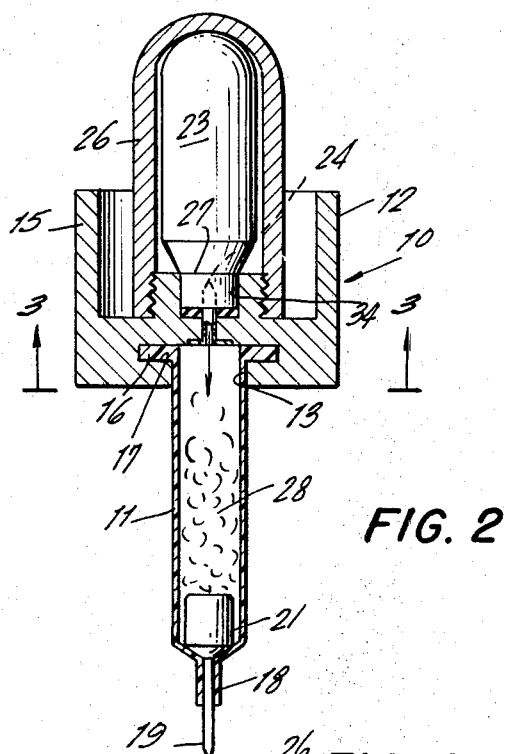
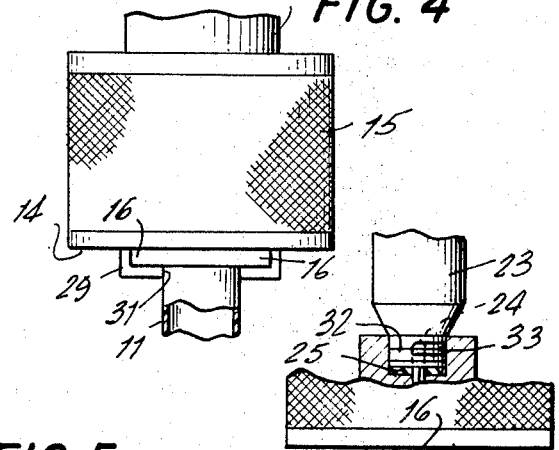
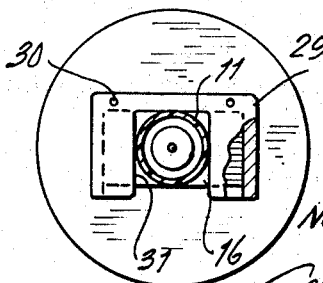
FIG. 2
FIG. 4
FIG. 5
FIG. 6
INVENTOR.
NORMAN O. STAHL
Albert F. Kronman
ATTORNEY

3,532,094

CRYOGENIC INSTRUMENT WITH DETACHABLE PROBE

BACKGROUND OF THE INVENTION

In certain surgical operations such as the removal of cataracts and the like, it is essential to lift a small piece of tissue with speed and accuracy. While it has been known to provide cryogenic instruments for this purpose in which the tip of the instrument is brought down to a very low temperature by the expansion of gases within a chamber, such instruments have been difficult to sterilize and therefore of a single use nature. Prior known devices have furthermore been large and cumbersome as contrasted with the usual surgical instrument which is small and easily manipulated.

SUMMARY OF THE INVENTION

The present invention contemplates the use of a cryogenic instrument having as part thereof a removable and sterilizable probe which is easily attached to the cold producing apparatus of the invention and which is of minimum size and weight.

DESCRIPTION OF THE DRAWINGS

FIG. 1 is a somewhat exploded view partially in longitudinal section showing a complete embodiment of the present invention.

FIG. 2 is a view in longitudinal section of the instrument shown in FIG. 1 in the assembled position.

FIG. 3 is a sectional view taken along the line 3–3 on FIG. 2.

FIG. 4 is a fragmentary elevational view of the cryogenic instrument showing another structure by which the probe is attached to the cooling apparatus.

FIG. 5 is a bottom plan view of the instrument shown in FIG. 4.

FIG. 6 is a fragmentary view of the cryogenic instrument partly in elevation and partly in section showing a further embodiment thereof.

DESCRIPTION OF PREFERRED EMBODIMENTS

Referring to the drawing and particularly to FIGS. 1, 2 and 3, 10 indicates a cryogenic instrument consisting of an elongated hollow probe 11 and a cooling apparatus 12. In the embodiment shown in FIGS. 1, 2 and 3, the probe 11 is detachably carried by the cooling apparatus 12 by means of a "T" shaped slot 13 which is cut into the bottom 14 of a knurled ring 15. The probe 11 is provided with a flange 16 at the top thereof which is adapted to slide into a enlarged portion 17 of the "T" shaped slot 13.

The probe 11 is made of some suitable plastic material such as nylon, Teflon, and the like, which is capable of being sterilized in an autoclave. The probe 11 is tubular as shown in FIGS. 1 and 2 and provided at one end with a tubular portion 18 of reduced diameter. A tip 19 is carried within the portion 18 and is made of some suitable metal such as copper, gold, silver or the like or silver plated copper. The tip 19 extends within the hollow chamber 20 of the probe 11 and is integral with an enlarged portion 21 which serves as a heat sink.

The cooling apparatus 12 of the present device consists of the ring 15 into which the probe 11 is slipped, a threaded boss 22 which extends upward and axially within the interior of the ring 15, and a cartridge 23 which slips into the boss 22. A hollow needle 24 is carried by the boss 22 in a well 34 and communicates with the "T" shaped slot 13 and of course the interior chamber 20 of the probe 11. A small gasket 25 is carried within the well of the boss 22 to form a fluid and gas tight connection between the bottom of the cartridge 23 and the bottom of the well of the boss. The cartridge 23 is filled with a suitable gas under pressure such as Freon. A thimble 26 is adapted to slip over the cylinder 23 and is threadably received upon the boss 22 in the manner shown in FIG. 2. As the thimble 26 is screwed down upon the boss 22, the needle 24 punctures a sealing member 27 of the cartridge 23 thereby releasing the Freon gas into the chamber 20 of the probe 11, the chamber having a volume approximating that of the cartridge. The expanding gas 28, best shown in FIG. 2, rapidly brings the temperature of the heat sink 21 and therefore the tip 19 down to (below zero) the freezing point. Now the instrument is ready for use and will remain cold long enough to finish the surgical purposes.

In lieu of the "T" shaped slot 17 shown in FIGS. 1, 2 and 3, it is possible to provide a bracket 29 as shown in FIGS. 4 and 5. The bracket 29 may be attached to the bottom 14 of the ring 15 by rivets 30 or the like and is formed with a 2-diameter slot 31 to provide the "T" shaped configuration necessary to detachably receive the probe 11.

It is also within the purview of the present invention to further reduce the weight of the cryogenic instrument by eliminating the thimble 26. In the embodiment shown in FIG. 6, the cartridge 23 is provided at its dispensing end with an external thread 32. The boss 22 is internally threaded as indicated at 33 to receive the thread 32. It will be apparent that as the gas cartridge 23 is screwed into the boss 22, in this embodiment, the needle 24 will pierce the seal 27 of the cartridge 23 to release the gas 28.

From the foregoing it will be seen that there has been provided a cryogenic instrument wherein the probe which is handled by surgeon and the tip which comes into contact with the patient may be sterilized. The instrument may accordingly be used over and over again merely by applying a new gas cartridge 23 for each use of the instrument. As a result, the instrument is reduced in size, is made more economical, and is more sanitary when used for surgical purposes.

I claim:

1. A cryogenic instrument comprising a housing having an end wall provided with a bore and having an annular boss projecting upwardly from said wall and providing a well, a hollow needle secured in said bore and extending into said well, a cartridge receivable in said well containing a pressurized gas refrigerant and having a sealing member facing the point of said needle, cooperating means for forcing said sealing member against said needle to thereby pierce said sealing member and permit the refrigerant to discharge completely through said needle, an elongated hollow probe formed of a material capable of being sterilized in an autoclave having an open end and an unobstructed chamber, said chamber having a volume approximating that of said cartridge, means for readily detachably securing the open end of said probe to said wall with the discharge end of said needle in direct and unobstructed fluid flow communication with said chamber to receive and retain said refrigerant, a metallic tip immovably fixed to said probe and extending outwardly therefrom at the end opposite the open end, and a metallic heat sink on said tip and mounted within said chamber at the end opposite the open end, said instrument being characterized in that, after complete discharge of the refrigerant into said chamber, said probe can be detached from said housing whereby a lightweight instrument is provided for performing cryogenic operations.